(12) United States Patent
Gomba

(10) Patent No.: US 9,934,610 B2
(45) Date of Patent: Apr. 3, 2018

(54) TECHNIQUES FOR RENDERING AND CACHING GRAPHICS ASSETS

(71) Applicant: Facebook, Inc., Menlo Park, CA (US)

(72) Inventor: Ryan Gomba, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 180 days.

(21) Appl. No.: 13/907,563

(22) Filed: May 31, 2013

(65) Prior Publication Data

US 2014/0354657 A1 Dec. 4, 2014

(51) Int. Cl.
*G06T 15/00* (2011.01)
*G06T 19/00* (2011.01)

(52) U.S. Cl.
CPC ..................... *G06T 19/00* (2013.01)

(58) Field of Classification Search
USPC ......................................................... 345/419
See application file for complete search history.

(56) References Cited

U.S. PATENT DOCUMENTS

| | | | |
|---|---|---|---|
| 5,861,893 A * | 1/1999 | Sturgess | 345/562 |
| 6,886,017 B1 * | 4/2005 | Jackson et al. | |
| 8,681,176 B1 * | 3/2014 | Maurer | G01C 21/367 |
| | | | 340/995.1 |
| 8,922,569 B1 * | 12/2014 | Tidd | G06T 1/00 |
| | | | 345/505 |
| 2007/0079244 A1 * | 4/2007 | Brugiolo | G06F 9/4445 |
| | | | 715/740 |
| 2008/0181502 A1 * | 7/2008 | Yang | 382/181 |
| 2009/0288019 A1 * | 11/2009 | Tunning | 715/760 |
| 2011/0304625 A1 * | 12/2011 | Gerhard et al. | 345/428 |
| 2013/0048739 A1 * | 2/2013 | West et al. | 235/494 |
| 2013/0076768 A1 * | 3/2013 | Chakraborty | G06T 1/60 |
| | | | 345/543 |
| 2013/0113833 A1 * | 5/2013 | Larsson | 345/642 |

* cited by examiner

*Primary Examiner* — Kyle Zhai
(74) *Attorney, Agent, or Firm* — Sheppard Mullin Richter & Hampton LLP

(57) ABSTRACT

Various embodiments are generally directed to techniques for downloading graphics assets of a software application in a form in which they are rendered as needed on a computing device based on its characteristics and then stored therein for later use. A computer-implemented method includes determining whether a requested graphics asset is stored in a storage of a computing device, retrieving the graphics asset from the storage when the graphics asset is stored in the storage, rendering the graphics asset when the graphics asset is not stored in the storage, and visually presenting the graphics asset on a display of the computing device. Other embodiments are described and claimed.

11 Claims, 12 Drawing Sheets

TECHNIQUES FOR RENDERING AND CACHING GRAPHICS ASSETS

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for downloading graphics assets of a software application in a form in which they are rendered as needed on a computing device based on its characteristics and then stored therein for later use. A computer-implemented method includes determining whether a requested graphics asset is stored in a storage of a computing device, retrieving the graphics asset from the storage when the graphics asset is stored in the storage, rendering the graphics asset when the graphics asset is not stored in the storage, and visually presenting the graphics asset on a display of the computing device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
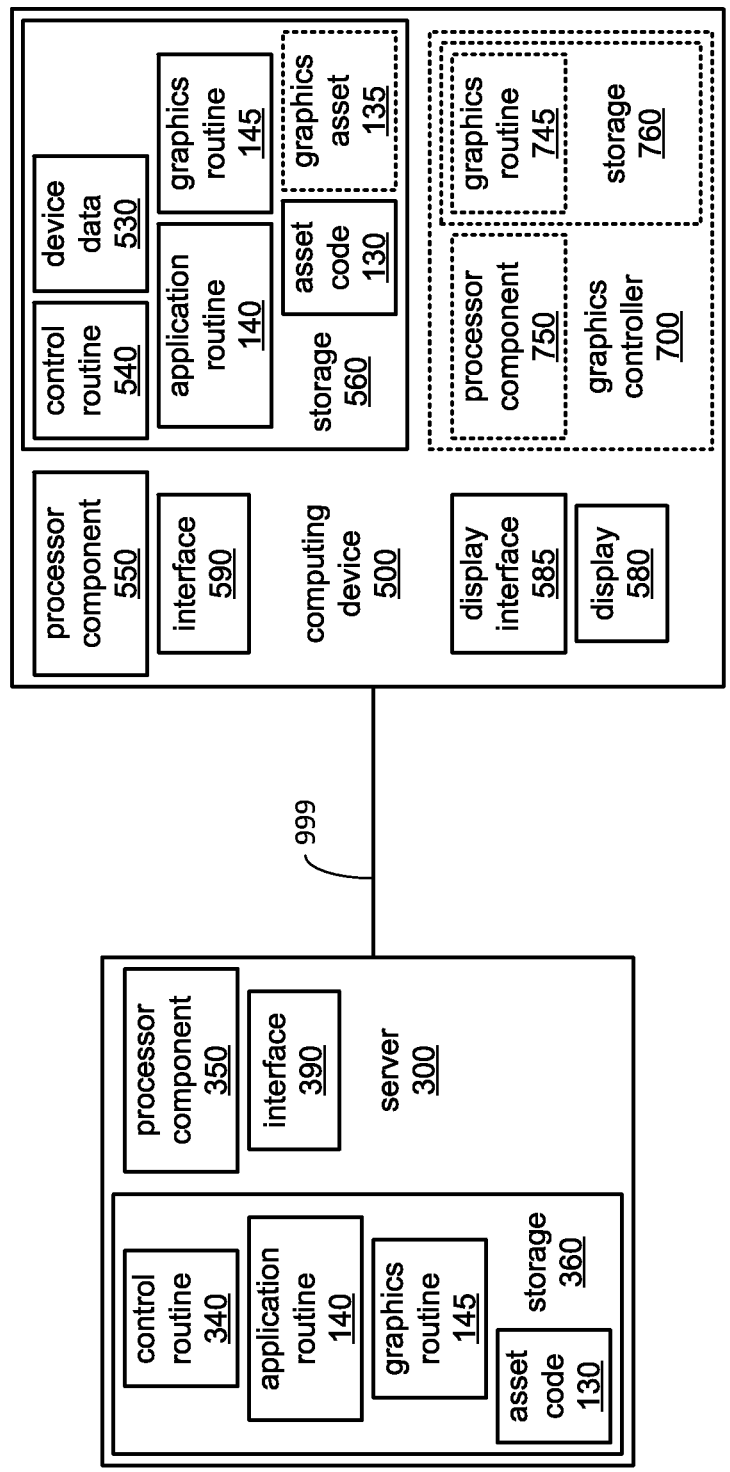
FIG. 1 illustrates an embodiment of a graphics rendering system.

Various embodiments are generally directed to user interfaces for software programs. Some embodiments are particularly directed to techniques for rendering and caching graphics assets for presentation on a user interface for a software program, such as a system or application program. In one embodiment, graphics assets of a software program may be communicated between computing devices in a definition form, rather than a rendered form, to reduce file size, conserve communication bandwidth and reduce traffic latency. The receiving computing device may then render the graphics assets based on the definitions. The receiving device may also uniquely identify and store the rendered graphic assets for later use by the same or different software program.

Embodiments include techniques for downloading graphics assets of a software application in a form in which they are rendered as needed on a computing device based on its characteristics and then stored therein for later use. More specifically, instead of downloading multiple incarnations of each graphics asset to accommodate any of a wide variety of computing devices, graphics assets are downloaded as asset code conveying instructions for rendering graphics assets on a computing device taking into account characteristics of that particular computing device. When each graphics asset is to be visually presented on a display of the computing device, a check is made as to whether that graphics asset was previously rendered and stored within the computing device for visual presentation. If previously rendered and stored, then that graphics asset is retrieved and presented. If not previously rendered and stored, then that graphics asset is so rendered for visual presentation and is stored for later use.

The asset code specifies any property, attribute or characteristic needed for rendering a graphic asset, including both shapes to be rendered and the styles to be used in rendering shapes for each graphics asset, for example. The shapes may be specified in any of a number of ways including in a script language, as a series of points, as a set of Bezier curves, or any other defined format. Similarly, the styles may be specified in any of a number of ways including in a script language, tags, parameters, and so forth. Embodiments are not limited in this context.

Along with the asset code, a graphics routine may also be downloaded. The graphics routine may include instructions executable on a processor component of a computing device to implement at least a portion of a graphics engine for rendering the graphics assets of the asset code. In some embodiments, the graphics routine may implement substantially all of the graphics engine for rendering graphics assets where the computing device may provide relatively little graphics rendering functionality. In other embodiments, the graphics routine may implement substantially little more of a graphics engine than to provide a mapping layer to convert procedure calls of one format in the asset code to procedure calls of another format employed in the graphics rendering functionality provided by the computing device.

Regardless of the degree to which the graphics routine directly performs the rendering of graphics assets of the asset code, the graphics routine performs a check of one or more characteristics of the computing device related to visually presentation. In some embodiments, the one or more characteristics include a characteristic of a display of the computing device (e.g., size, resolution, pixel density, etc.). Following such a check, the graphics routine controls the rendering of graphics assets based on the one or more characteristics.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a graphics rendering system 1000 incorporating one or both of a server 300 and a computing device 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 300 and 500 exchange signals conveying executable instructions and data for rendering graphics assets through a network 999. However, one or more of the computing devices 300 and 500 may exchange other data entirely unrelated to the rendering of graphics assets with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the server 300 incorporates one or more of a processor component 350, a storage 360 and an interface 390 to couple the server 300 to the network 999. The storage 360 stores one or more of a control routine 340, an application routine 140, a graphics routine 145 and asset code 130. The control routine 340 incorporates a sequence of instructions operative on the processor component 350 to implement logic to perform various functions. In executing the control routine 340, the processor component 350 cooperates with other computing devices (e.g., the computing device 500) via the network 999 to transmit one or more of the application routine 140, the graphics routine 145 and the asset code 130 to those other computing devices as a download.

In some embodiments, the application routine 140, the graphics routine 145 and the asset code 130 are downloaded from the server 300 to other computing devices together. In other embodiments, the processor component 350 selectively downloads one or more of the application routine 140, the graphics routine 145 and the asset code 130 to other computing devices based on determinations of whether or not the versions of each maintained in the storage 360 is newer than the versions stored within those other computing devices.

The application routine 140 may be any of a variety of types of routine operative on a processor component of a computing device, including and not limited to a work productivity routine (e.g., a word processor, spreadsheet and/or email client software), an audio and/or video entertainment routine (e.g., an audio and/or video recording and/or playback routine), a data viewing routine (e.g., a web browser or graphics data file viewer), etc. During normal operation, the application routine 140 employs various graphics assets in visually presenting information as part of providing a user interface. In so doing, the application routine 140 signals another routine (e.g., the graphics routine 145) with requests to visually present the graphics assets.

The graphics routine 145 incorporates a sequence of instructions operative on the processor component 350 of the computing device 500 to implement at least a portion of a graphics engine for rendering graphics assets, such as those to be visually presented as part of a user interface of the application routine 140, for example. When employed in cooperation with the application routine 140, the graphics routine 145 receives requests from the application routine 140 to visually present a graphics asset, such as the graphics asset 135. In some embodiments, the graphics asset 135 is downloaded in a non-rendered form as part of the asset code 130 that provides a definition of the graphics asset 135. In this case, the asset code 130 may be used to render the graphics asset 135.

The asset code 130 may include a set of definitions suitable for use in rendering the graphics asset 135 and/or multiple graphics assets. More particularly, the asset code 130 may comprise a set of logic, rules, definitions, descriptors, and/or parameters representing a set of properties, attributes or characteristics for the graphics asset 135 that the graphics routine 145 may use to actually render the graphics asset 135. Thus, in downloading the asset code 130, the graphics asset 135 is downloaded in a form in which it is not rendered. The asset code 130 may separately convey both definitions of shape of the graphics asset 135 and style by which shape of the graphics asset 135 is to be rendered.

Examples of the asset code 130 include without limitation one or more of indications of points and/or segments; scripting language; indications of Bezier curves, fractals, wavelets, polygons and/or other geometric elements; and indications of textures, patterns and/or wave sampling. Where a scripting language is used in defining shape, the scripting language may specify arithmetic, logical and/or other operations to employ in combining polygons, Bezier curves, fractals wavelets, etc. Where a scripting language is used in defining style, the scripting language may specify junctions, unions and/or other operations to employ in combining textures, patterns, samplings, etc. Embodiments are not limited in this context.

An advantage of downloading the graphics asset 135 in a non-rendered form in which a definition of its characteristics for being subsequently rendered is that the graphics asset 135 can often be described more compactly, resulting in smaller data and/or file sizes, as well as reduced transmission times via the network 999. This advantage is enhanced where multiple graphics assets are downloaded that are able to re-use a common set of styles and/or graphics primitives from which shapes may be defined. More significant reductions in data and/or file sizes, as well as reduced transmission times, are realized where downloading a definition for rendering the graphics asset 135 enables the downloading of multiple incarnations of the graphics asset to suit different computing devices to be avoided. Specifically, the fact of rendering the graphics asset 135 on the computing device 500 enables the rendering of the graphics asset 135 to be controlled to take into account characteristics of the computing device 500. As a result, the graphics asset 135 need be downloaded only once in a non-rendered form, versus many times in various incarnations of a rendered form.

In visually presenting the graphics asset 135, the graphics routine 145 renders it in accordance with indications of the various properties, attributes or characteristics associated with the graphics asset 135 (e.g., shape and style) provided in the asset code 130, taking into account one or more characteristics of the computing device 500 on which the graphics asset 135 will be visually presented (e.g., a characteristic of the display 580 of a computing device 500). As will be explained in greater detail, the graphics routine 145 conditions the rendering of the graphics asset 135 on a determination of whether it has been previously rendered and stored for later visual presentation.

In various embodiments, the computing device 500 incorporates one or more of a processor component 550, a storage 560, a display 580, a display interface 585, a graphics controller 700 and an interface 590 to couple the computing device 500 to the network 999. The storage 560 stores one or more of a control routine 540, a device data 530, the application routine 140, the graphics routine 145, the asset code 130 and a graphics asset 135. The graphics controller 700, if present, incorporates one or more of a processor component 750 and a storage 760. The storage 760 of the graphics controller 700 (again, if present) stores a graphics routine 745.

The control routine 540 incorporates a sequence of instructions operative on the processor component 550 to implement logic to perform various functions. In executing the control routine 540, the processor component 550 cooperates with another computing device (e.g., the server 300) via the network 999 to download one or more of the application routine 140, the graphics routine 145 and the asset code 130 therefrom, and store each of these in the storage 560. In some embodiments, such cooperation may be triggered by the computing device 500 having been operated by a user to select the application routine 140 for downloading from another computing device (e.g., the server 300). The graphics routine 145 and the asset code 130 may be received from the other computing device as part of downloading the application routine 140. In other embodiments, such cooperation may be triggered automatically as a result of the processor component 550 periodically comparing the versions of each of the application routine 140, the graphics routine 145 and the asset code 130 stored in the storage 560 with versions maintained by another computing device, such as the server 300. Where the version of one or more of these maintained by the other computing device is newer, the processor component 550 may be automatically triggered to download those newer versions.

Once downloaded and stored in the storage 560 along with the graphics routine 145 and the asset code 130, the application routine 140 signals the graphics routine 145 to visually present a graphics asset 135 on the display 580. In response, the graphics routine 145 initially checks the storage 560 to determine whether the graphics asset 135 has been previously rendered and stored therein. If the graphics routine 145 determines that the graphics asset 135 is stored in the storage 560, then the graphics routine 145 retrieves the graphics asset 135 therefrom and visually presents it on the display 580. However, if the graphics routine 145 determines that the graphics asset 135 is not stored in the storage 560, then the graphics routine 145 renders the graphics asset 135 and stores it in the storage 560 in addition to also visually presenting it on the display 580. In rendering the graphics asset 135, the graphics routine 145 retrieves an indication of one or more characteristics of the computing device 500 from the device data 530, and controls the rendering of the graphics asset 135 based at least in part on the one or more characteristics.

In some embodiments in which the computing device 500 incorporates limited resources in the way of a graphics rendering capability, the graphics routine 145 may implement some or all of a graphics engine to provide a graphics rendering capability to render the graphics asset 135. In other embodiments in which the computing device 500 incorporates at least some substantial graphics rendering capability implemented by the processor component 550 executing instructions of a routine (e.g., the control routine 540), the graphics routine 145 may not implement a substantial portion of a graphics engine. Instead, the graphics rendering capability of the computing device 500 may be at least partially relied upon to render the graphics asset 135.

In still other embodiments in which the computing device 500 incorporates the graphics controller 700 to provide substantially all of the graphics rendering capability required to render the graphics asset 135, the graphics routine 145 may implement substantially little in the way of a graphics rendering capability. Instead, the graphics routine 145 may incorporate a mapping layer to convert between sets of procedure calls to provide an interface to the graphics controller 700 to enable the use of its graphics rendering capability to render the graphics asset 135. In such embodiments, the graphics controller 700 may incorporate its own processor component 750 executing instructions of a separate graphics routine 745 stored in it own storage 760. Alternatively or additionally, the graphics controller 700 may incorporate circuitry not reliant on a processor component to perform at least some aspects of graphics rendering.

Thus, upon receiving a request from the application routine 140 to visually present the graphics asset 135, and upon determining that the graphics asset 135 has not previously been rendered and stored for later use, the graphics routine 145 may render the graphics asset 135 largely unassisted by a graphics rendering capability of the computing device 500. Alternatively, the graphics routine 145 may cooperate with another routine of the computing device 500 (e.g., the control routine 540) to render the graphics asset 135. As still another alternative, the graphics routine 145 may signal the graphics controller 700 to render the graphics asset 135.

In various embodiments, each of the processor components 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

Although each of the processor components 350, 550 and 750 may include any of a variety of types of processor, it is envisioned that the processor component 750 of the graphics controller 700 of the computing device 500 may be somewhat specialized and/or optimized to perform tasks related to graphics, including graphics rendering. More broadly, it is envisioned that the controller 700 servers as a graphics subsystem of the computing device 700 to enable the performance of tasks related at least to graphics rendering, using components separate and distinct from the processor component 550 and its more closely related components.

In various embodiments, each of the storages 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 390 and 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
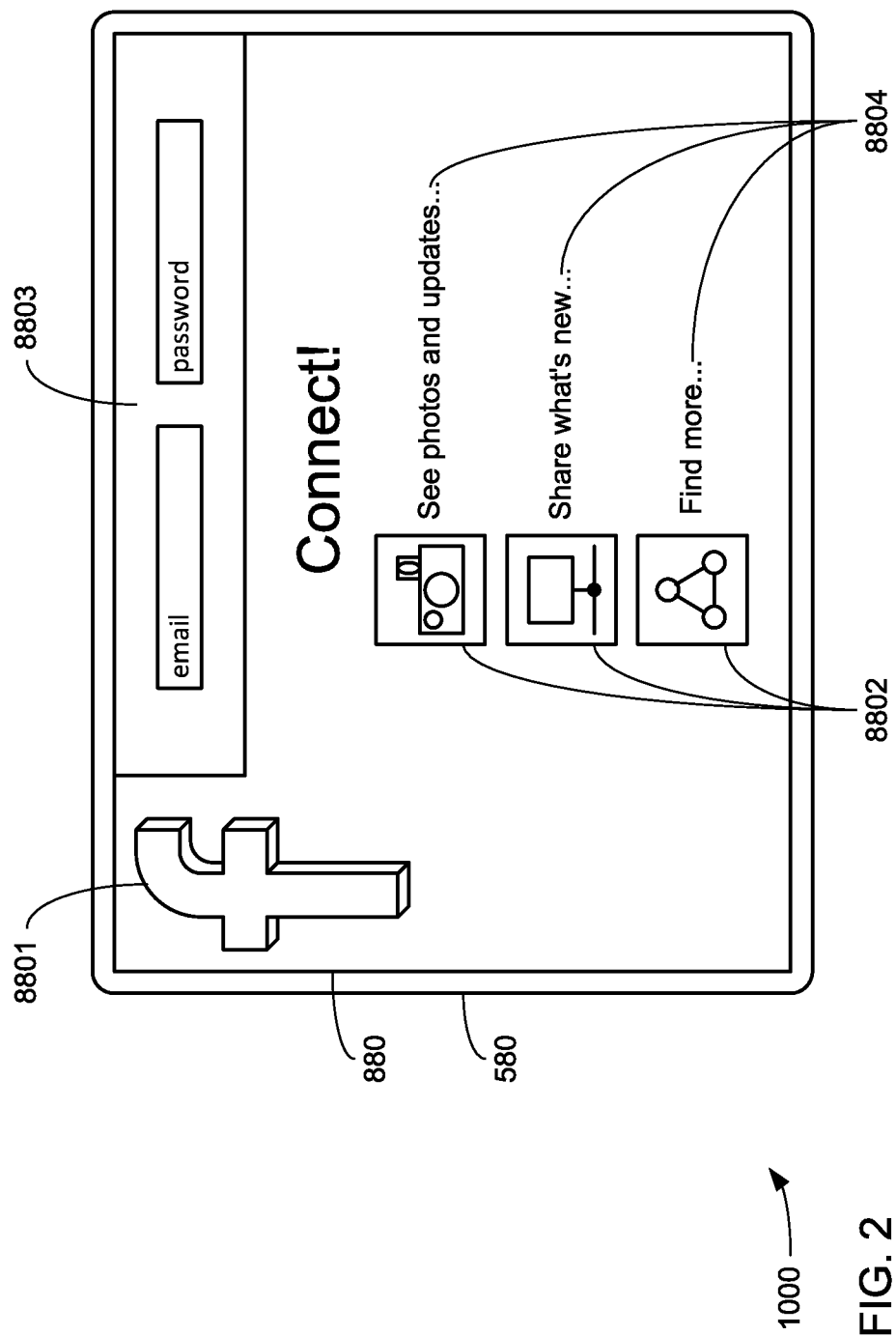
FIG. 2 illustrates an embodiment of a first user interface.

FIG. 2 illustrates a visual presentation of exemplary graphics assets suitable for use with various embodiments. As shown in FIG. 2, graphics assets 8801, 8802, 8803 and 8804 on the display 580 of the computing device 500 by the graphics routine 145 as part of visually presenting an example visual portion 880 of a user interface of the application routine 140. The graphics assets 8801-8804 are shown in their rendered form after rendering by the graphics routine 145. As familiar to those skilled in the art, the term "graphics asset" refers to a wide variety of graphics elements often used as "building blocks" in creating visual imagery. Such graphics elements may be bitmaps of captured images, imagery rendered in two dimensions from three-dimensional models, imagery created using composites of geometric shapes, etc. As depicted, a graphics asset may be a logo 8801 for a corporate or other entity, a menu icon 8802 serving to label and/or provide a selectable object for each menu item, a box 8803 to provide a visually separate field in a visual image such as the depicted "login" area to gain access to social interaction website, and/or a portion of text 8804. Embodiments are not limited to these examples.

Figure 3:
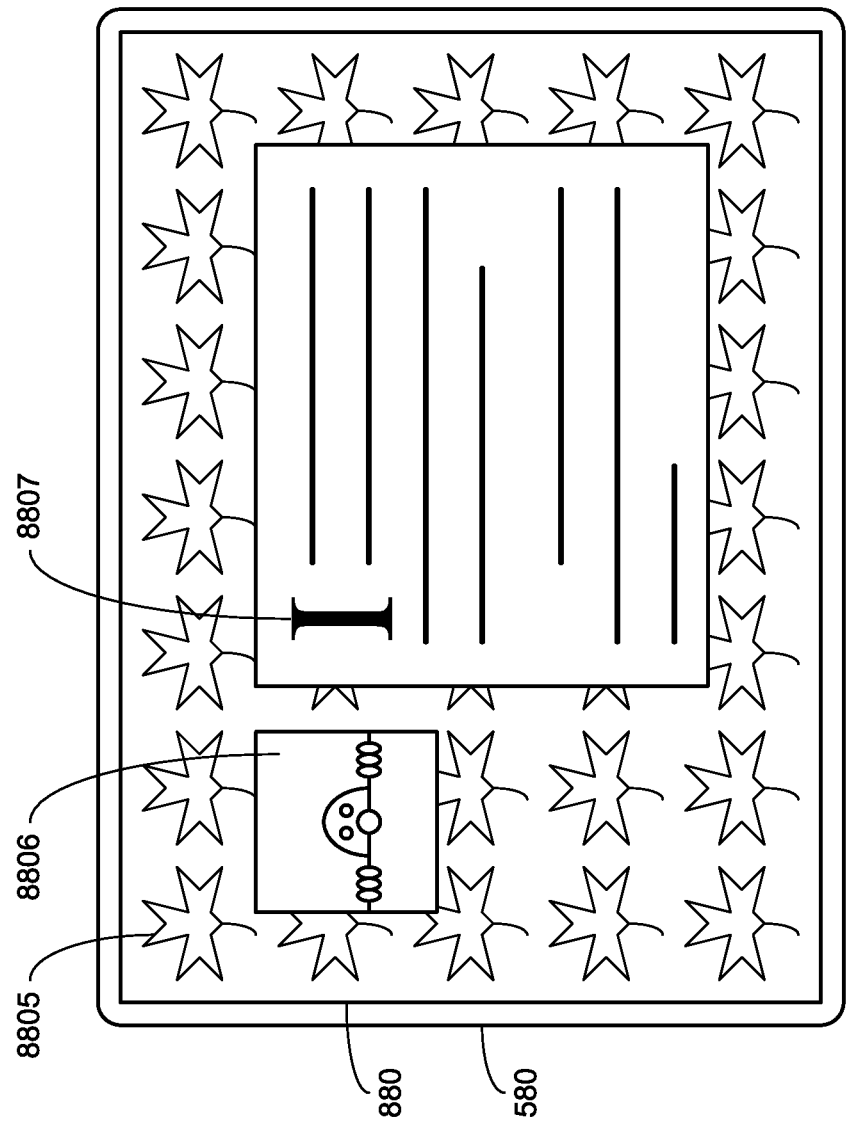
FIG. 3 illustrates an embodiment of a second user interface.

FIG. 3 illustrates the visual presentation of another exemplary visual portion 880 of a user interface on the display 580 that includes the visual presentation of example graphics assets 8805, 8806 and 8807. As depicted, a graphics asset may be a visual pattern 8805 repeated numerous times to provide a visual background, an avatar image 8806 selected by a user in lieu of a portrait image for an online personal profile, and/or a stylized text character 8807. Such use of graphics assets to construct imagery enables the efficient creation of numerous different "pages" of a visual portion of a user interface from elements that can be repeatedly reused. There is no need to store bitmaps of entire screen-sized images for each such page, and the visual portion of a user interface is able to be created and modified more efficiently.

Figure 4A:
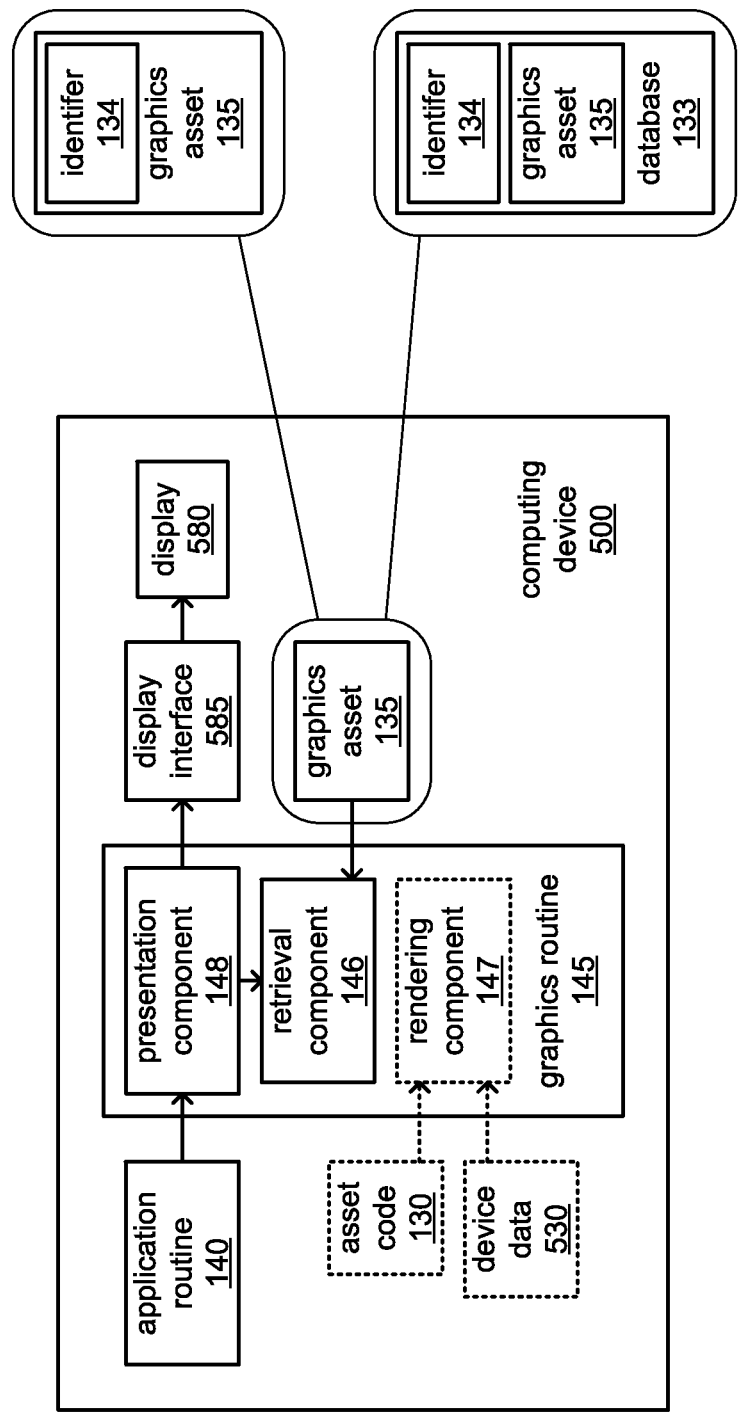
FIG. 4A illustrates an embodiment of a first operating environment for a graphics rendering system.
Figure 4B:
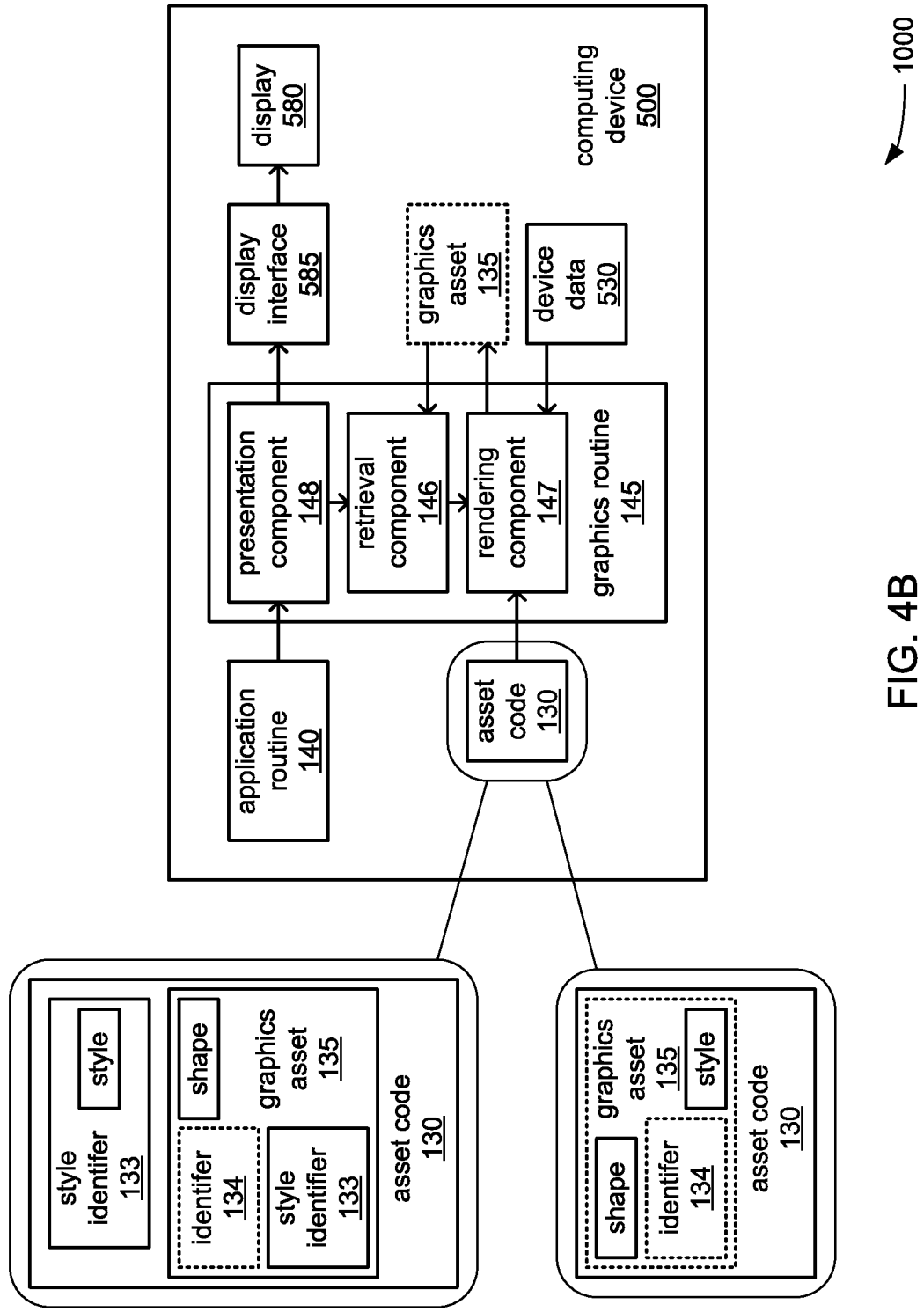
FIG. 4B illustrates an embodiment of a second operating environment for a graphics rendering system.

FIGS. 4A and 4B each illustrate a block diagram of a portion of an embodiment of the graphics rendering system 1000 of FIG. 1 in greater detail. More specifically, FIGS. 4A and 4B depict differences in the visual presentation of the graphics asset 135 on the display 580 depending on whether the graphics asset 135 was previously rendered and stored within the same embodiment of a computing device 500. FIG. 4A depicts an example of visually presenting the graphics asset 135 that entails retrieval of the graphics asset 135 from storage in response to a determination that the graphics asset 135 has been previously rendered and stored. FIG. 4B depicts an example of visually presenting the graphics asset 135 that entails rendering and storage of the graphics asset 135 in response to a determination that the graphics asset 135 has not been previously rendered and stored.

Referring to both FIGS. 4A and 4B, the graphics routine 145 includes a presentation component 148 executable by the processor component 550 to receive a request from the application routine 140 to visually present the graphics asset 135 on the display 580 and to do so. In some embodiments, the request from the application routine 140 includes an identifier specifying the graphics asset 135 as the graphics asset to be visually presented on the display 580, and an indication of the location on the display 580 at which the graphics asset 135 is to be visually presented. In response, the presentation component 148 signals a retrieval component 146 of the graphics routine 145 with a request to provide the presentation component 148 with the graphics asset 135. In various embodiments, this request from the presentation component 148 may include the identifier of the graphics asset 135 received from the application routine 140.

The graphics routine 145 includes the retrieval component 146 executable by the processor component 550 to determine whether the graphics asset 135 requested by the presentation component 148 has already been rendered such that it can be retrieved, and to request rendering of the graphics asset 135 if it has not already been rendered. More specifically, in response to the request for the graphics asset 135 received from the presentation component 148, the retrieval component 146 determines whether the graphics asset 135 is already stored within the storage 560 computing device 500.

It may be that the graphics asset 135 was previously rendered and stored such that it can be retrieved for visual presentation, as depicted in FIG. 4A. In determining whether the graphics asset 135 has been rendered and stored, the retrieval component 146 may employ whatever identifier of the graphics asset 135 it receives in the request from the presentation component 148 to attempt to locate the graphics asset 135 within the storage 560. The identifier 134 uniquely identifies the graphics asset 135, at least among components of the graphics routine 145, though the identifier 134 may be so used more generally throughout the computing device 500 beyond the components of the graphics routine 145. In some embodiments, the identifier 134 is used in the request from the application routine 140 to the graphics routine 145, and in other embodiments the identifier 134 may be used in requests from the graphics routine 145 to other components of the computing device 500, including other routines. Alternatively, in some embodiments, the identifier 134 may be derived within the graphics routine 145 from whatever identifier is received from the application routine 140 to specify the graphics asset 135. By way of example, the identifier 134 may incorporate the identifier received from the application routine 140 along with indication(s) of other information such as a version of the graphics asset 135.

As depicted, the graphics asset 135 may be stored in any of a variety of ways, including and not limited to, as a data file having a file name that incorporates an indication of an identifier 134, as an element of data in a database 133 in which it is linked to and locatable by the identifier 134, as an element of an array (not shown) indexed by the identifier 134, etc. Upon determining that the graphics asset 135 has been previously rendered and stored by locating it, the retrieval component 146 retrieves the graphics asset 135 from storage and provides it to the presentation component 148 for visual presentation on the display 580.

Alternatively, and as depicted in FIG. 4B, it may be that the graphics asset 135 has not been previously rendered and stored such that it can be retrieved for visual presentation. Again, the retrieval component 146 attempts to locate the graphics asset 135 within the storage 560, and may use the identifier 134 to do so. Upon determining that the graphics asset 135 has not been previously rendered and stored as a result of failing to locate it, the retrieval component 146 signals a rendering component 147 of the graphics routine 145 with a request to render the graphics asset 135. In various embodiments, this request from the retrieval component 146 may include the identifier 134.

Retrieval of the graphics asset 135, regardless of whether it was previously rendered and stored, may be conditioned by the retrieval component 146 on whether the application routine 140 is permitted to request visual presentation of the graphics asset 135. By way of example, the asset code 130 and/or the graphics asset 135 as stored in rendered form in the storage 560 may include an indication of a restriction concerning what routines may request that it be visually presented. This may arise, for example, where the graphics asset 135 is a trademarked logo such that it is desired to allow only routines associated with the entity owning the trademark to request its visual presentation. Thus, the request received from the application routine 140 may include an identifier of the application routine 140 and/or an entity (e.g., a person, a business, a governmental agency, etc.) associated with the application routine 140 that is provided to the retrieval component 146 to determine whether or not the graphics asset 135 should be retrieved for visual presentation.

The graphics routine 145 includes the rendering component 147 executable by the processor component 550 to render the graphics asset 135. More specifically, in response to the request to render the graphics asset 135 received from the retrieval component 146, the rendering component 147 renders the graphics asset 135 and stores it within the storage 560. Where the computing device 500 does not incorporate the graphics controller 700 (or the graphics controller 700 is otherwise unavailable), the rendering component 147 may include instructions to implement at least a substantial portion of a graphics engine for rendering the graphics asset 135. The rendering component 147 employs the identifier 134 to retrieve indications of shape and style for rendering the graphics asset 135 from the asset code 130. The rendering component also retrieves an indication of one or more characteristics of the computing device 500 germane to rendering the graphics asset 135 for visual presentation by the computing device 500 (e.g., one or more characteristics of the display 580 or display interface 585).

As depicted, the shapes and styles of the graphics asset 135 may be organized for access within the asset code 130 in various ways. In some embodiments, the indications of shape and style are stored individually for each graphics asset such that none are shared among multiple graphics assets, and the indications of shape and style for the graphics asset 135 may exist at a single entry in the asset code 130 accessible by using the identifier 134 as an index. In other embodiments, the indications of shape are stored individually for each graphics asset, while a shared set of styles is maintained separately from the storage of each graphics asset. In such embodiments, an entry for the graphics asset 135 may include a style identifier 133 that references one of the shared styles as the particular style with which the graphics asset 135 is to be rendered. As previously discussed, shapes may be specified for a graphics asset in any of a number of ways including in a script language, as a series of points, as a set of Bezier curves, etc. Similarly, the styles may be specified in any of a number of ways including in a script language, etc.

Upon retrieving the indications of shape and style of the graphics asset 135, the rendering component 147 interprets those indications in rendering the graphics asset 135. Further, the rendering component 147 controls the rendering of the graphics asset 135 to give the graphics asset 135 characteristics that take into account one or more characteristics of the computing device 500 specified in the device data 530. By way of example, the rendering component 147 may adjust the pixel resolution at which it renders the graphics asset 135 to account for the pixel density of the display 580 indicated in the device data 530 to ensure that the graphics asset 135 appears with a consistent size on the display 580. By way of another example, the rendering component 147 may adjust the color depth at which it renders the graphics asset 135 to match the color depth at which the display interface 585 buffers and transmits imagery to the display 580 for visually presentation. An advantage of rendering the graphics asset 135 on the computing device 500 from indications of its shape and style while taking into account one or more characteristics of the computing device 500 is that multiple different incarnations of the graphics asset 135 meant to be used with different pixel densities, different color depths, etc. do not have to be downloaded into the computing device 500. Instead, a single pair of indications of shape and style is all that need to be downloaded, and then the graphics asset 135 is able to be rendered in a manner that accommodates characteristics of the computing device 500.

By way of example, in rendering the exemplary graphics asset 8801 of FIG. 2, an indication of its "f" shape, an indication of its depth edging style, and an indication of a characteristic of the computing device 500 may all be used. The edges of the "f" shape may be specified by Bezier curves, a series of points between segments and/or a set of polygons. The depth edging style giving the "f" shape an appearance of depth may be specified by script language conveying a procedure for selecting edges of the "f" shape along which such depth edging may be provided. A color depth characteristic of the display interface 585 may be employed to control the color depth with which a color of the "f" shape indicated in the style is encoded in the pixel data of each of the pixels making up the graphics asset 8801 in its rendered form.

Upon rendering the graphics asset 135, the rendering component 147 stores the graphics asset 135 in the storage 560 and signals the retrieval component 146 that the graphics asset 135 has been rendered. In various embodiments, the retrieval component 146 may retrieve the graphics asset 135 from the storage 560 or may receive it more directly from the rendering component 147. Regardless of how the retrieval component 146 is provided with the graphics asset 135, the retrieval component 146 provides it in turn to the presentation component 148 for visual presentation. The presentation component 148 then provides the graphics asset 135 to the display interface 585 along with an indication of a location on the display 580 at which to visually present the graphics asset 135, and the display interface 585 then visually presents the graphics asset 135 on the display 580 as directed.

Figure 5A:
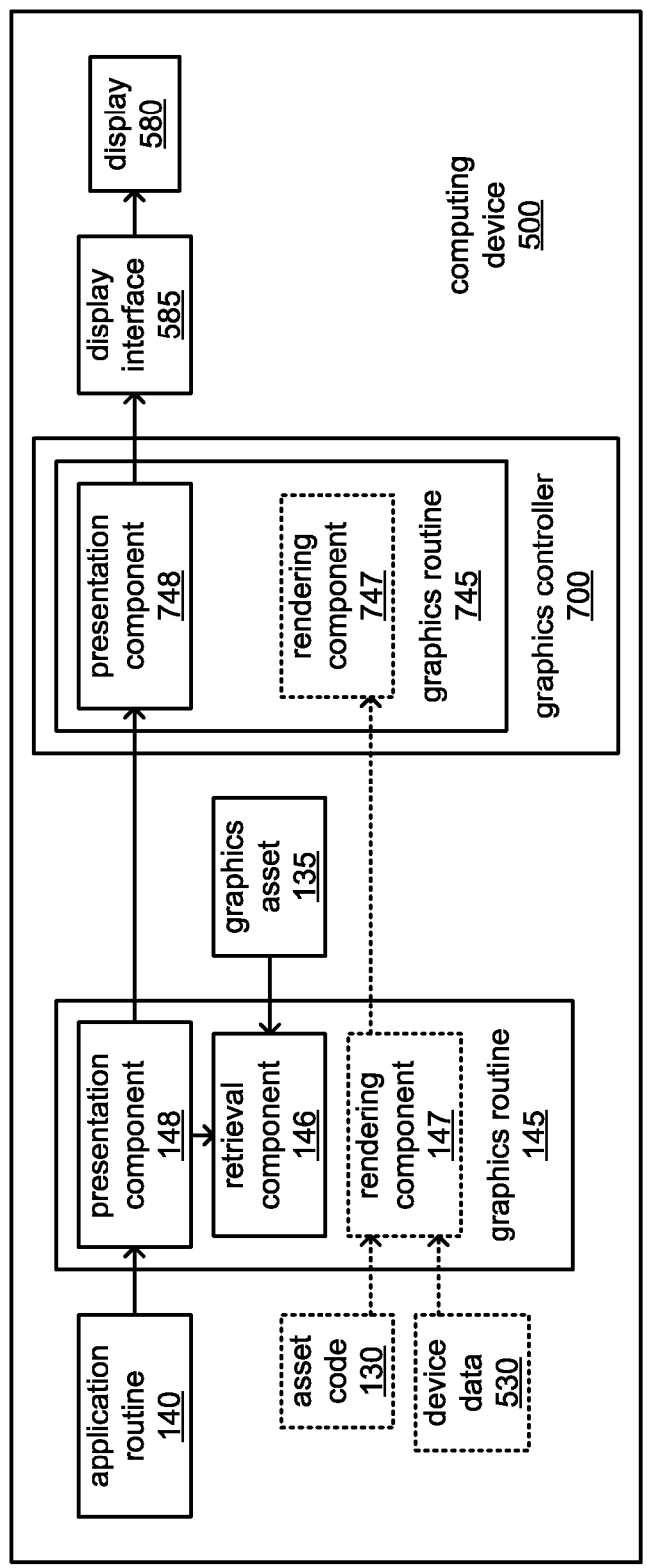
FIG. 5A illustrates an embodiment of a third operating environment for a graphics rendering system.
Figure 5B:
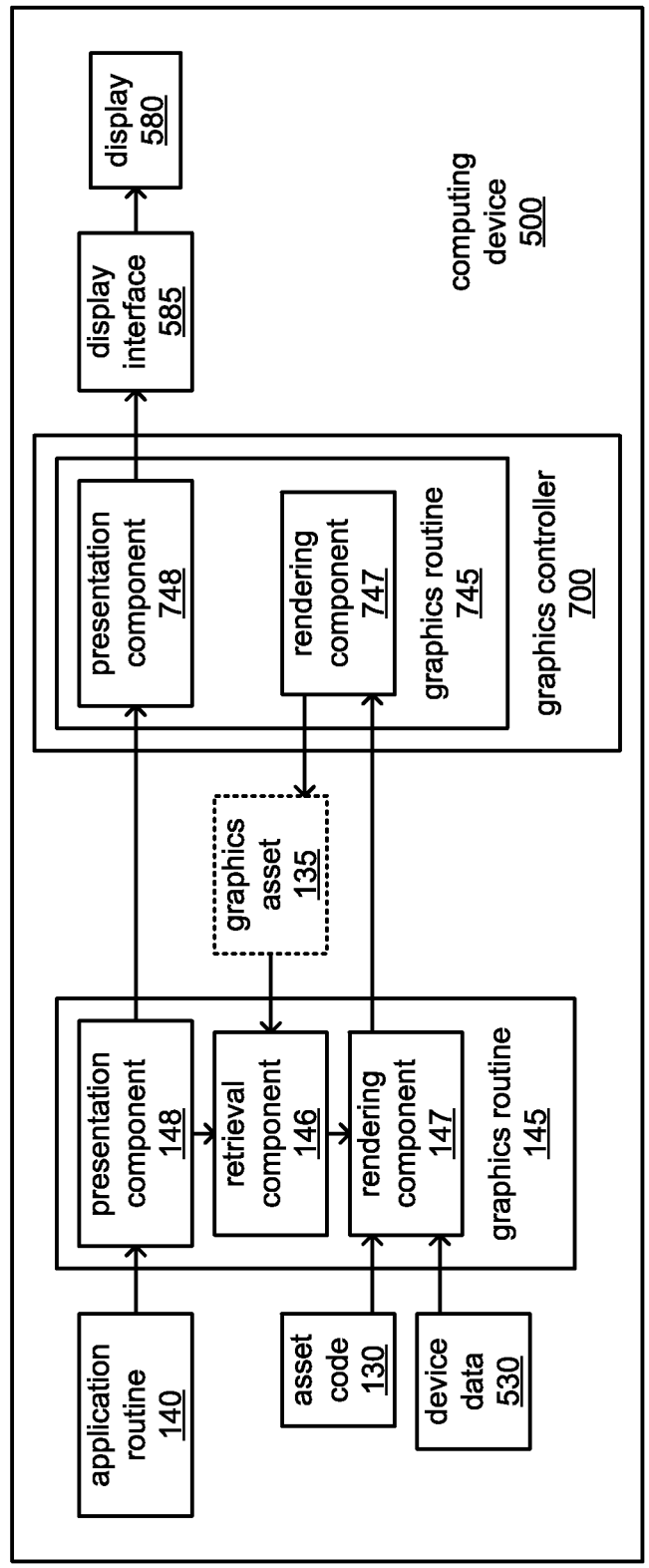
FIG. 5B illustrates an embodiment of a fourth operating environment for a graphics rendering system.

FIGS. 5A and 5B each illustrate a block diagram of a portion of an embodiment of the graphics rendering system 1000 of FIG. 1 in greater detail. Like FIGS. 4A and 4B, FIGS. 5A and 5B depict differences in the visual presentation of the graphics asset 135 on the display 580 depending on whether the graphics asset 135 was previously rendered and stored within the computing device 500. However, unlike FIGS. 4A and 4B, FIGS. 5A and 5B depict these differences as applied to an alternate embodiment in which the computing device 500 incorporates the graphics controller 700. FIG. 5A depicts an example of visually presenting the graphics asset 135 that entails retrieval of the graphics asset 135 from storage in response to a determination that the graphics asset 135 has been previously rendered by the graphics controller 700 and stored. FIG. 5B depicts an example of visually presenting the graphics asset 135 that entails signaling the graphics controller 700 to render the graphics asset 135 in response to a determination that the graphics asset 135 has not been previously rendered and stored.

Turning to FIG. 5A, and in a manner similar to the example of FIG. 4A, the presentation component 148 receives a request from the application routine 140 to visually present the graphics asset 135 on the display 580. Again, the presentation component 148 signals a request to the retrieval component 146 to provide the graphics asset 135, and the retrieval component 146 searches for the graphics asset 135 within the storage 560. As in the example of FIG. 4A, the retrieval component 146 determines that the graphics asset 560 has been previously rendered and stored as a result of successfully locating and retrieving it from the storage 560. The retrieval component 146 again provides the graphics asset 135 to the presentation component 148 to be visually presented.

However, unlike the example of FIG. 4A, in FIG. 5A, the presentation component 148 provides the graphics asset 135 to a presentation component 748 of the graphics routine 745 executable by the processor component 750 of the graphics controller 700. It is then the presentation component 748 of the graphics controller 700 that provides the graphics asset 135 to the display interface 585 to be visually presented on the display 580 at whatever location was specified in the original request received from the application routine 140.

Turning to FIG. 5B, and in a manner similar to the example of FIG. 4B, the retrieval component 146 again searches for the graphics asset 135 within the storage 560 in response to receiving a request from the presentation component 148 for the graphics asset 135. As in the example of FIG. 4B, the retrieval component 146 does not find the graphics asset 135 in the storage 560 and thereby determines that the graphics asset 135 has not been previously rendered and stored. In response, the retrieval component 146 again signals the rendering component 147 to render the graphics asset 135.

However, unlike the example of FIG. 4B, in FIG. 5B, the rendering component 147 responds to the request from the retrieval component 146 by signaling a rendering component 747 of the graphics routine 745 with a request to render the graphics asset 135. In conveying that request, the rendering component 147 provides the rendering component 747 with the indications of shape and style for the graphics asset 135 from the asset code 130. Further, despite not performing the rendering of the graphics asset 135, the rendering component 147 controls the rendering performed by the rendering component 747 to accommodate one or more characteristics of the computing device 500 specified in the device data 530 that are germane to rendering graphics assets.

As discussed with regard to the example of FIG. 4B, the rendering component 147 in that example implemented a substantial portion of a graphics engine to render the graphics asset 135. However, in FIG. 5B, the rendering component 147 implements an interface to the rendering component 747 to convert procedure calls and/or other interface protocols to enable the rendering component 147 to control the rendering of the graphics asset 135 by the rendering component 747.

Upon completion of rendering the graphics asset 135, the graphics controller 700 stores the graphics asset 135 in the storage 560 from which the retrieval component 146 retrieves it. As in the example of FIG. 5A, the retrieval component then provides the graphics asset 135 to the presentation component 148. In turn, the presentation component 148 provides the graphics asset 135 to the presentation component 748 along with an indication of the location at which the graphics asset 135 is to be visually presented on the display 580, which the presentation component 748 then provides to the display interface 585 for such visual presentation.

Figure 6:
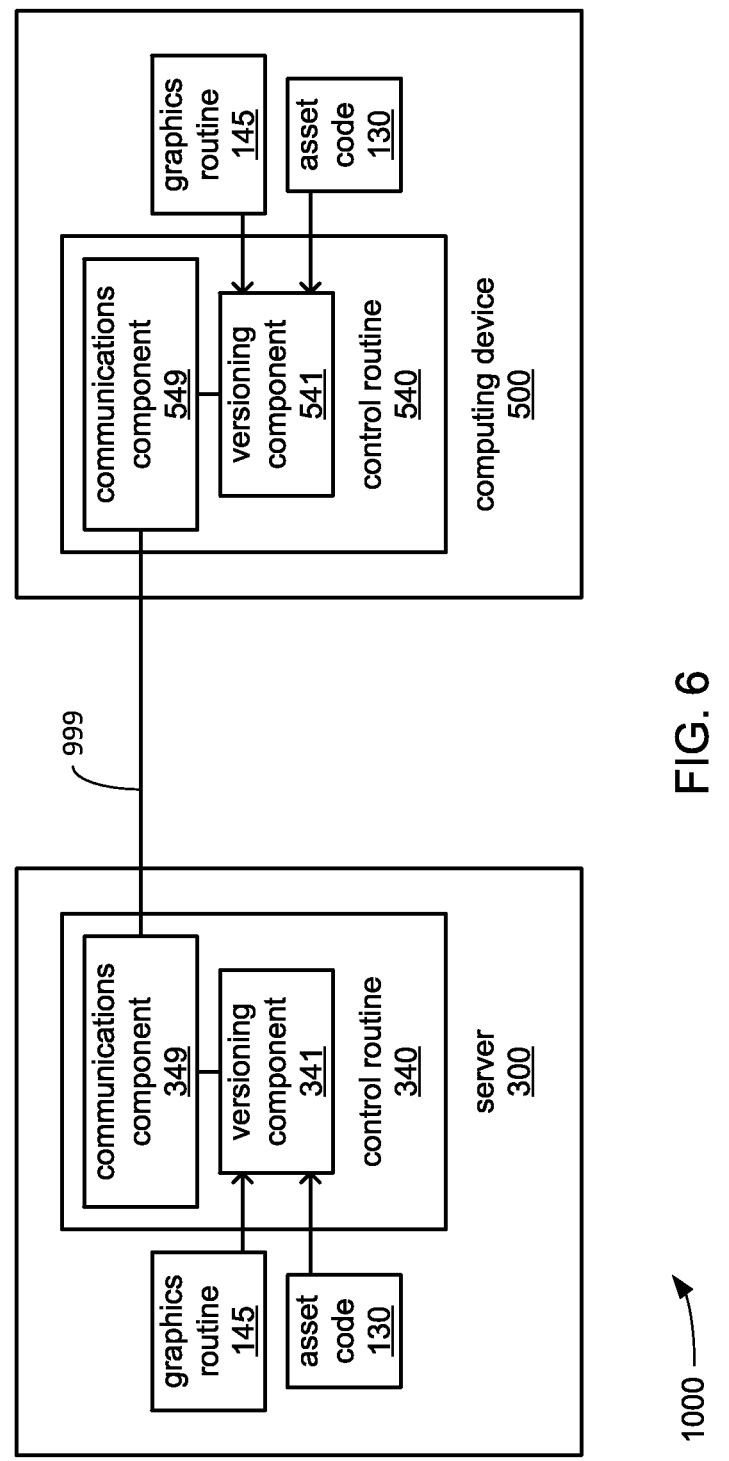
FIG. 6 illustrates an embodiment of a fifth operating environment for a graphics rendering system.

FIG. 6 illustrates a block diagram of a portion of an embodiment of the graphics rendering system 1000 of FIG. 1 in greater detail. More specifically, FIG. 6 depicts an example of selective downloading of newer versions of one or more of the graphics routine 145 and the asset code 130.

In various embodiments, each of the control routines 340 and 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 and 550. Where one or more device drivers are included, those device drivers may provide support for any of a variety of other components, whether hardware or software components, of corresponding ones of the computer systems 300 and 500.

The control routines 340 and 540 include a communications component 349 and 549, respectively, executable by corresponding ones of the processor components 350 and 550 to operate the interfaces 390 and 590 to transmit and receive signals via the network 999 as has been described. Among the signals received may be signals conveying the graphics routine 145 and/or the asset code 130 among the computing devices 300 and 500 via the network 999. As will be recognized by those skilled in the art, each of these communications components is selected to be operable with whatever type of interface technology is selected to implement corresponding ones of the interfaces 390 and 590.

The control routines 340 and 540 also include a versioning component 341 and 541, respectively, executable by corresponding ones of the processor components 350 and 550 to compare versions of at least the graphics routine 145 and the asset code 130 stored within the computing devices 300 and 500. Such comparisons may be triggered on a recurring basis in which the versioning component 541 may signal the versioning component 341 to begin such a comparison following the elapsing of a recurring interval of time. Alternatively, such comparisons may be triggered on an event-driven basis such as by the versioning component 341 signaling the versioning component 541 to begin such a comparison in response to an update of the version(s) of the graphics routine 145 and/or the asset code 130 stored within the server 300.

It is envisioned that the shape and/or style of the graphics asset 135 may change with a change in version of at least the asset code 130 as stored in the storage 560 of the computing device 500 to a newer version. Further, a newer version of the application routine 140 stored within the computing device 500 may be configured to work with a newer version of the graphics asset 135 having changes in shape and/or style indicated in a newer version of the asset code 130. Thus, when the newer version of the application routine 140 requests that the graphics asset 135 be visually presented on the display 580, it may be a newer version of the graphics asset 135 that corresponds to a newer version of the asset code 130 that in turn is meant to correspond to the newer version of the application routine 140. As a result, the retrieval component 146 may cease to retrieve an older version of the graphics asset 135 that had been earlier rendered and stored in the storage 560. Instead, the retrieval component 146 may first attempt to locate the newer version of the graphics asset 135 in the storage 560, and upon determining that the newer version has not yet been rendered and stored, may signal the rendering component 147 to render the newer version of the graphics asset 135 and store it in the storage 560 for future use.

Returning briefly to FIG. 4A, the identifier 134 may, in some embodiments, incorporate an indication of version of the graphics asset 135, and the version may correspond to the version of the asset code 130 that includes indications of its shape and style. A newer version of the application routine 140 may specify a newer version of the graphics asset 135 than has been previously rendered and stored with such an embodiment of the identifier 134 to thereby indicate the specific version of the graphics asset 135 to be visually presented. The retrieval component 146 may locate the presence of an older version of the graphics asset 135 in the storage 560. However, upon failing to locate the newer version indicated in the identifier 134 such that the retrieval component 146 determines that the newer version of the graphics element 135 has not yet been rendered and stored, the retrieval component 146 may use the identifier 134 to signal the rendering component 147 to render that newer version of the graphics asset 135.

In some embodiments, the retrieval component 146 may respond to locating a version of the graphics asset 135 that is older than a version specified to be visually displayed by removing (e.g., deleting, erasing, overwriting, etc.) that older version of the graphics asset 135 in the storage 560. This may be deemed desirable to minimize wastage of the limited storage capacity of the storage 560 from continuing to store versions of graphics assets that have been replaced with newer versions.

Figure 7:
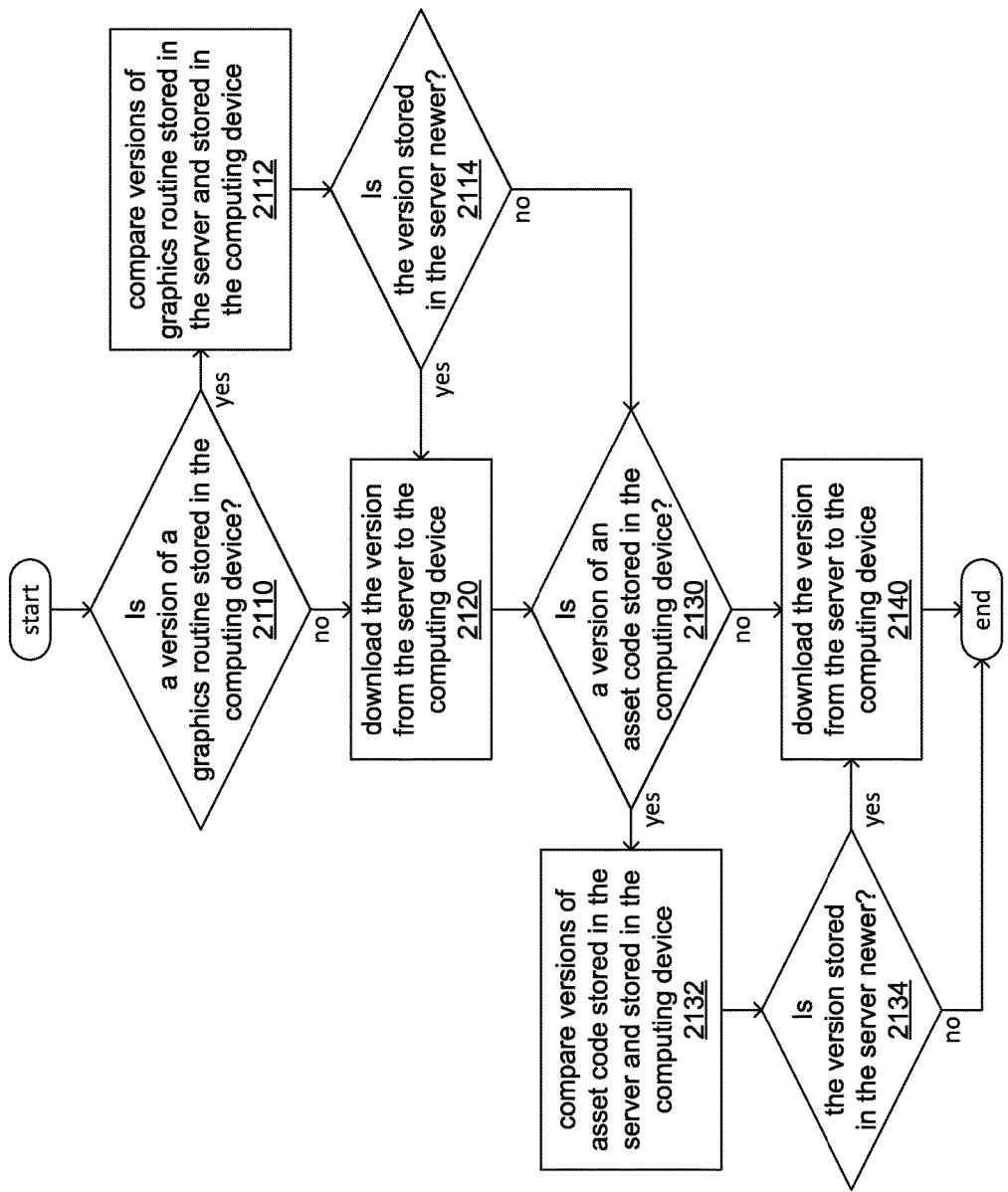
FIG. 7 illustrates an embodiment of a first logic flow.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of the computing device 500, respectively.

At 2110, a processor component of a computing device (e.g., the processor component 550 of the computing device 500) engaged in the downloading of an application routine (e.g., the application routine 140) that requires an accompanying graphics routine and asset code (e.g., the graphics routine 145 and the asset code 130) performs a check of whether any version of the graphics routine is already stored in the computing device (e.g., within the storage 560). If not, then the graphics routine is downloaded from a server (e.g., the server 300) at 2120 and stored in the computing device. Then, a check is made at 2130 of whether any version of the asset code is already stored in the computing device.

However, if at 2110, a version of the graphics routine is already stored in the computing device, then a comparison is made at 2112 between the versions of the graphics routine stored in the computing device and the version maintained in the server. If, at 2114, the version of the graphics routine maintained by the server is newer than the version stored in the computing device, then the graphics routine is downloaded from the server at 2120. However, if the version of the graphics routine maintained by the server is not newer, then the check for the storage of a version of the asset code within the computing device is made at 2130.

If, at 2130, there is not version of the asset code stored within the computing device, then the asset code is downloaded from the server at 2140 and stored in the computing device. However, if there is a version of the asset code stored within the computing device, then a comparison is made at 2132 between the versions of the asset code stored in the computing device and the version maintained in the server. If, at 2134, the version of the asset code maintained by the server is newer than the version stored in the computing device, then the asset routine is downloaded from the server at 2140.

Figure 8:
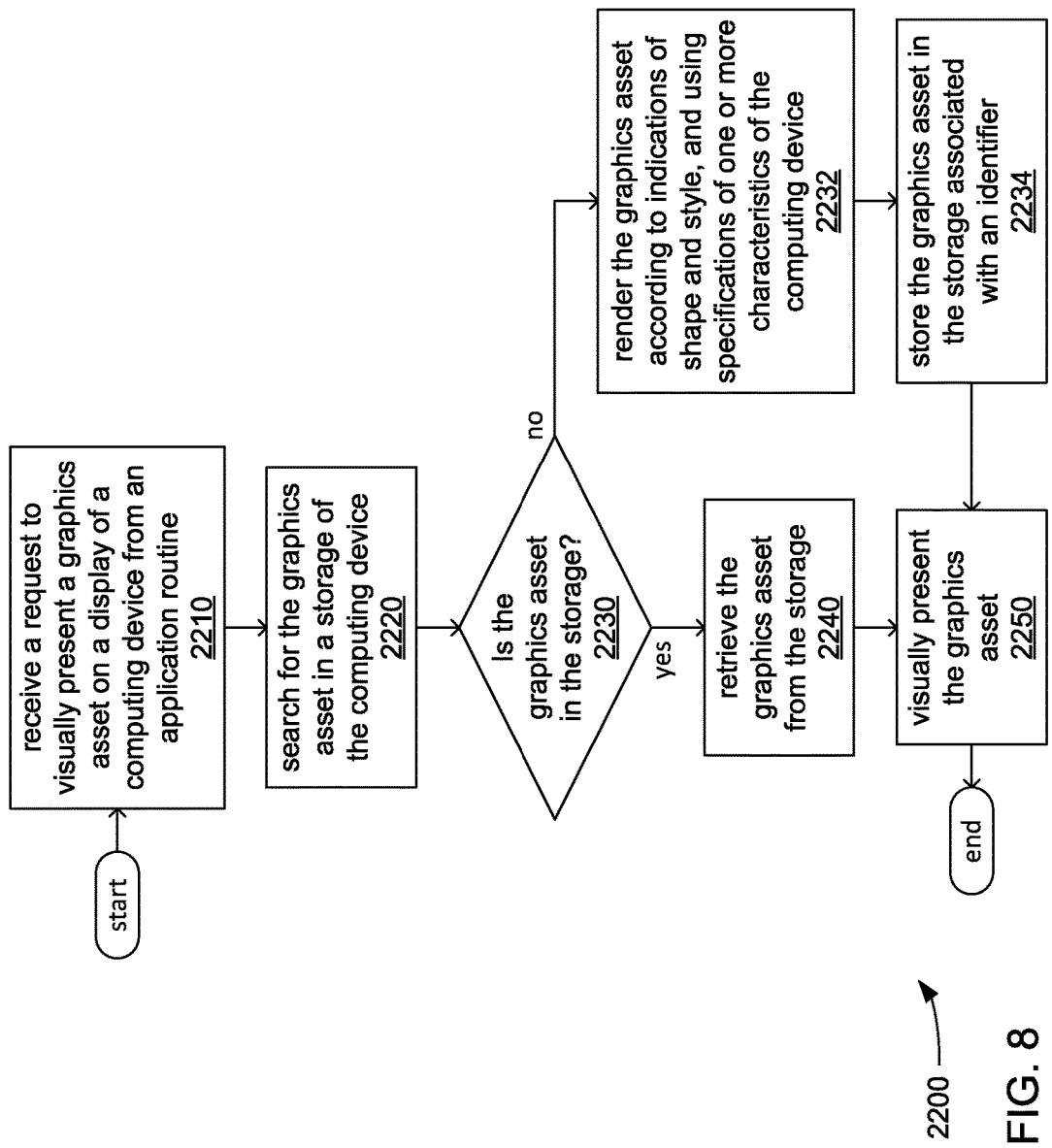
FIG. 8 illustrates an embodiment of a second logic flow.

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the graphics routine 145, and/or performed by other component(s) of the computing device 500, respectively.

At 2210, a processor component of a computing device (e.g., the processor component 550 of the computing device 500) executing instructions of a graphics routine (e.g., the graphics routine 145) receives a request to visually present a graphics asset on a display of the computing device (e.g., the display 580) from an application routine (e.g., the application routine 140). As has been discussed, the request from the application routine may specify the graphics asset via an identifier (e.g., the identifier 134) and include an indication of a location on the display at which the graphics asset is to be visually presented.

At 2220, a storage of the computing device (e.g., the storage 560) is searched for the graphics asset. As has been discussed, an identifier that may be at least based on the manner in which the application routine specified the graphics asset may be used in attempting to locate the graphics asset in the storage.

At 2230, if the graphics asset is located in the storage, then it is retrieved therefrom at 2240, and visually presented on the display at 2250. As has been discussed, the graphics asset is visually presented on the display at the location that may be indicated in the request originally received from the application routine.

However, at 2230, if the graphics asset is not located in the storage, then it is rendered in accordance with indications of shape and style retrieved from an asset code, and the rendering is controlled to accommodate one or more characteristics of the computing device that are germane to rendering graphics assets at 2232. At 2234, the newly rendered graphics asset is stored in the storage in a manner associated with an identifier enabling its retrieval for later use.

At 2250, the graphics asset is visually presented on the display of the computing device. As has been discussed, the location at which the graphics asset is visually presented may be indicated in the original request received from the application routine.

Figure 9:
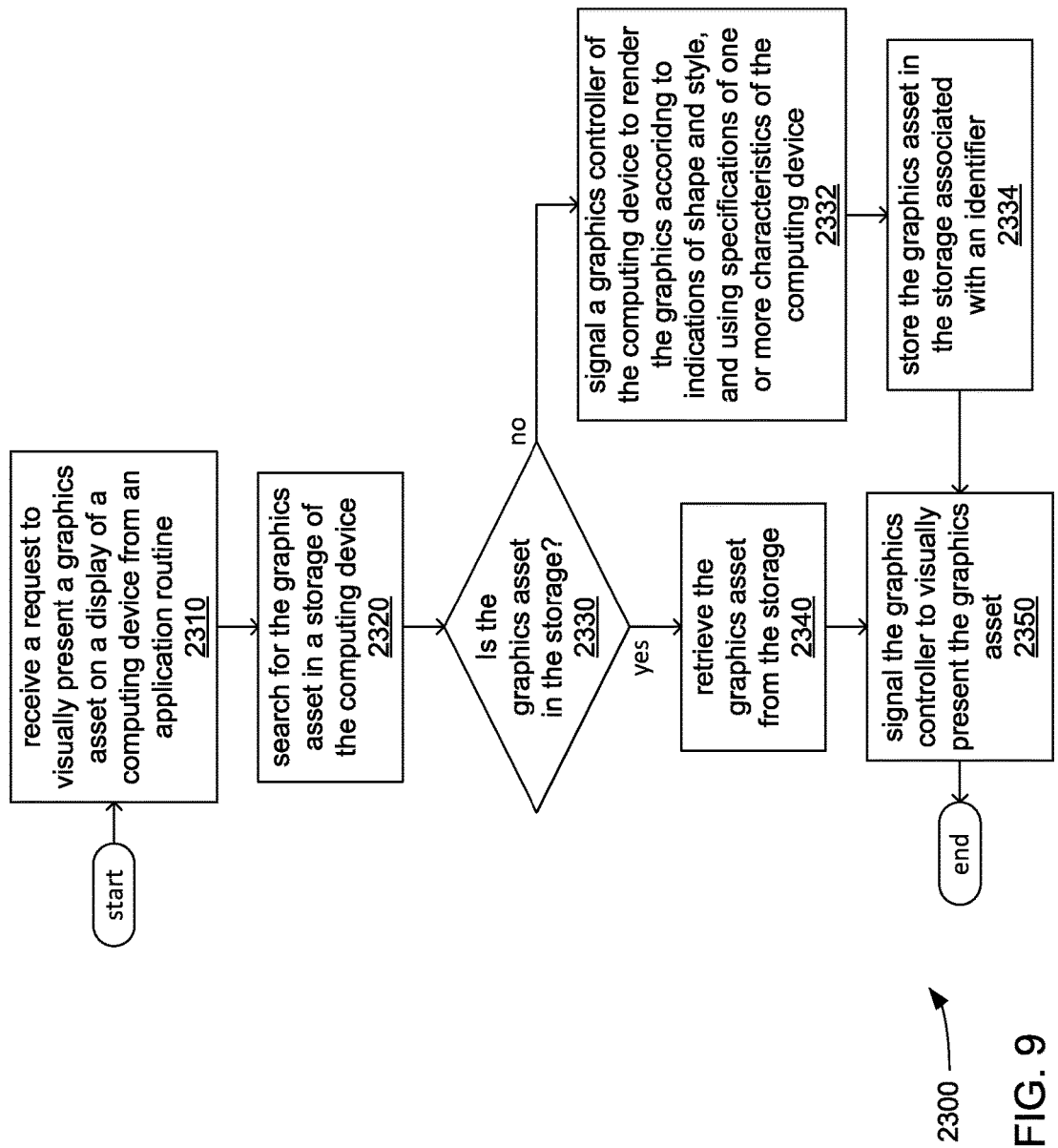
FIG. 9 illustrates an embodiment of a third logic flow.

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the graphics routine 145, and/or performed by other component(s) of the computing device 500, respectively.

At 2310, a processor component of a computing device (e.g., the processor component 550 of the computing device 500) executing instructions of a graphics routine (e.g., the graphics routine 145) receives a request to visually present a graphics asset on a display of the computing device (e.g., the display 580) from an application routine (e.g., the application routine 140). At 2320, a storage of the computing device (e.g., the storage 560) is searched for the graphics asset.

At 2330, if the graphics asset is located in the storage, then it is retrieved therefrom at 2340, and visually presented on the display at 2350. As has been discussed, the graphics asset is visually presented on the display at the location that may be indicated in the request originally received from the application routine.

However, at 2330, if the graphics asset is not located in the storage, then a graphics controller of the computing device (e.g., the graphics controller 700) is signaled to render the graphics asset in accordance with indications of shape and style retrieved from an asset code, and the rendering is controlled to accommodate one or more characteristics of the computing device that are germane to rendering graphics assets at 2332. At 2334, the newly rendered graphics asset is stored in the storage in a manner associated with an identifier enabling its retrieval for later use. At 2350, the graphics controller is further signaled to visually present the graphics asset on the display.

Figure 10:
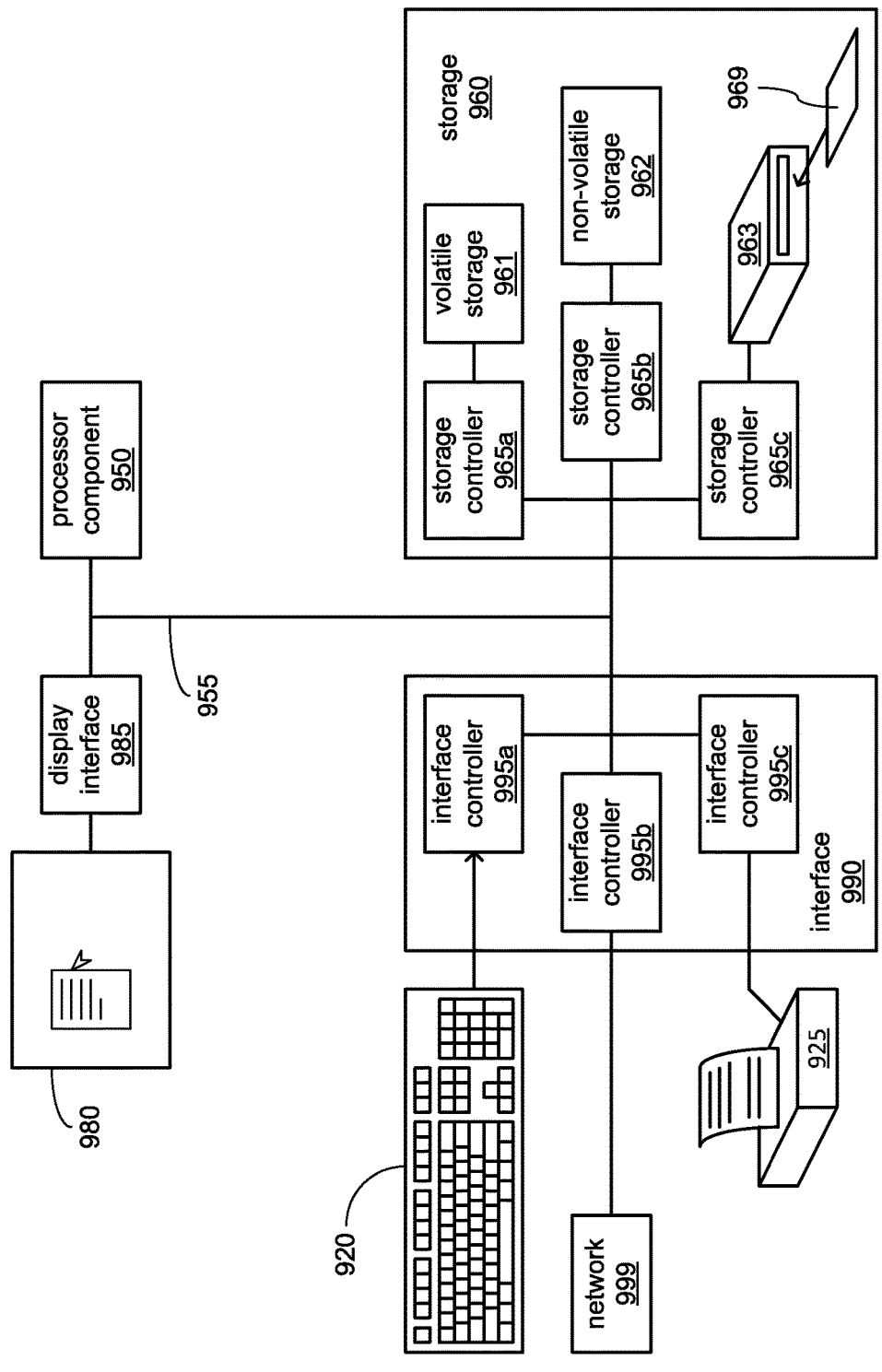
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of one or more of the computing devices 300 or 500, or the controller 700. It should be noted that components of the processing architecture 3000 are given reference numbers in which the last two digits correspond to the last two digits of reference numbers of at least some of the components earlier depicted and described as part of the computing devices 300 and 500, as well as the controller 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190, 390 or 690) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 380 or 680), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method comprising:
determining whether a first graphics asset requested by an application routine executing on a computing device is stored in rendered form in a storage of the computing device;
retrieving, at the computing device, the first graphics asset in rendered form from the storage when the first graphics asset is stored in the storage;
downloading, at the computing device, a graphics routine and an asset code, the graphics routine comprising a sequence of instructions for implementing at least a portion of a graphics engine for rendering graphics assets, and the asset code comprising definitions defining one or more graphics assets, including the first graphics asset, for rendering by the graphics routine;
rendering the first graphics asset from a non-rendered form into a rendered form using the graphics routine and the asset code, wherein the first graphics asset is rendered into the rendered form to match a color depth of a display of the computing device; and
visually presenting the first graphics asset in the rendered form on the display of the computing device.

2. The computer-implemented method of claim 1, further comprising rendering the first graphics asset based on the asset code, the asset code comprising instructions of a scripting language.

3. The computer-implemented method of claim 1, further comprising rendering the first graphics asset based on a further specification of the computing device.

4. The computer-implemented method of claim 1, further comprising saving the first graphics asset in the rendered form into the storage.

5. An apparatus comprising:
a processor component;
a presentation component for execution by the processor component to receive a request to visually present a first graphics asset and to visually present the first graphics asset on a display of a computing device;
a retrieval component for execution by the processor component to determine whether the first graphics asset is stored in a rendered form in a storage accessible to the processor component;
a download component for execution by the processor component to download a graphics routine and an asset code, the graphics routine comprising a sequence of instructions for implementing at least a portion of a graphics engine for rendering graphics assets, and the asset code comprising definitions defining one or more graphics assets, including the first graphics asset, for rendering by the graphics routine; and a rendering component for execution by the processor component to render the first graphics asset from a non-rendered form into a rendered form using the graphics routine and the asset code, wherein the first graphics asset is rendered into the rendered form to match a color depth of the display of the computing device.

6. The apparatus of claim 5, wherein the presentation component transmits a command to a graphics controller accessible to the processor component to visually present the first graphics asset.

7. The apparatus of claim 5, further comprising a versioning component for execution by the processor component to compare a version of the graphics routine to a version of a second graphics routine stored in the storage to determine whether to receive the graphics routine from the server.

8. The apparatus of claim 5, wherein the rendering component transmits a command to a graphics controller accessible to the processor component to render the first graphics asset.

9. The apparatus of claim 5, further comprising a storage component for execution by the processor component to save the first graphics asset in the rendered form into the storage.

10. At least one non-transitory machine-readable storage medium comprising instructions that when executed by a computing device, cause the computing device to:

determine whether a first graphics asset requested by an application routine executing on a computing device is stored in a rendered form in a storage of the computing device;

retrieve the first graphics asset in rendered form from the storage when the first graphics asset is stored in the storage;

download a graphics routine and an asset code, the graphics routine comprising a sequence of instructions for implementing at least a portion of a graphics engine for rendering graphics assets, and the asset code comprising definitions defining one or more graphics assets, including the first graphics asset, for rendering by the graphics routine;

render the first graphics asset from a non-rendered form into a rendered form using the graphics routine and the asset code, wherein the graphics asset is rendered into a rendered form to match a color depth of a display of the computing device; and visually present the first graphics asset in the rendered form on the display of the computing device.

11. The machine-readable storage medium of claim 10, wherein the instructions further cause the computing device to save the first graphics asset in the rendered form into the storage.

* * * * *